United States Patent [19]

Watanabe et al.

[11] Patent Number: 4,646,143
[45] Date of Patent: Feb. 24, 1987

[54] VIDEO PROJECTOR TYPE TELEVISION RECEIVER

[75] Inventors: Toshiro Watanabe, Zushi; Minoru Ohzeki, Yokohama; Takashi Toyama, Kokubunji, all of Japan

[73] Assignee: Sony Corporation, Tokyo, Japan

[21] Appl. No.: 645,818

[22] PCT Filed: Dec. 28, 1983

[86] PCT No.: PCT/JP83/00464
§ 371 Date: Aug. 27, 1984
§ 102(e) Date: Aug. 27, 1984

[87] PCT Pub. No.: WO84/02583
PCT Pub. Date: Jul. 5, 1984

[30] Foreign Application Priority Data

Dec. 28, 1982 [JP] Japan .............................. 57-231151

[51] Int. Cl.[4] ............................................. H04N 5/74
[52] U.S. Cl. .................................... 358/60; 358/237; 358/239; 358/231; 358/251
[58] Field of Search ............... 358/60, 231, 237, 238, 358/234, 251; 353/32, 33

[56] References Cited

U.S. PATENT DOCUMENTS

| 2,342,778 | 2/1944 | Wolff | 358/237 |
| 3,145,264 | 8/1964 | Schulz | 358/251 |
| 3,255,665 | 6/1966 | Weiher et al. | |
| 3,781,091 | 12/1973 | Ferguson | 358/251 |
| 4,151,554 | 4/1979 | Tucker | 358/60 |
| 4,405,949 | 9/1983 | Hockenbrock et al. | 358/237 |
| 4,511,927 | 4/1985 | Bauer | 358/231 |
| 4,533,850 | 8/1985 | Watanabe et al. | 313/36 |
| 4,563,699 | 1/1986 | Watanabe et al. | 358/60 |

FOREIGN PATENT DOCUMENTS

| 46-39314 | 11/1971 | Japan . | |
| 53-140931 | 12/1978 | Japan . | |
| 2117531 | 10/1983 | United Kingdom | 358/60 |
| 2117562 | 10/1983 | United Kingdom | 358/237 |

Primary Examiner—Michael A. Masinick
Assistant Examiner—Robert M. Bauer
Attorney, Agent, or Firm—Lewis H. Eslinger; Alvin Sinderbrand

[57] ABSTRACT

The present invention relates to a video projector type television receiver in which a prism plate is disposed in front of a color cathode ray tube, a projection lens is located in front of the prism plate and transparent liquid is injected into the space between the color cathode ray tube and the prism plate and the space between the prism plate and the projection lens. So, according to the present invention, since a difference between the refractive indexes of the transparent liquid and each component is not so large as that between the refractive indexes of the air and each component, it is possible to reduce a reflection on each boundary surface and also it is possible to prevent a multiple reflection image from being caused and a light amount from being lost greatly. Furthermore, owing to the liquid cooling effect of the transparent liquid, it is possible to suppress the thermal expansion of each portion so that the resultant influence such as the change of optical path and so on can be reduced.

12 Claims, 13 Drawing Figures

VIDEO PROJECTOR TYPE TELEVISION RECEIVER

DESCRIPTION

1. Technical Field

The present invention relates to a video projector type television receiver in which an image light from the phosphor screen of a color cathode ray tube is projected through a projection lens onto a picture screen to thereby form on the picture screen a magnified picture image.

2. Background Art

A video projector type television receiver using a color cathode ray tube is constructed in principle as shown in FIG. 1.

In the figure, reference numeral 1 designates a color cathode ray tube in which a phosphor screen 1a is made of, for example, a stripe-shaped color phosphor pattern. The image light from the phosphor screen 1a of the color cathode ray tube 1 is projected through a projection lens 3 onto a picture screen 4 so that a magnified picture image 5 is formed on this picture screen 4. In this case, at the same time when the magnified picture image 5 is formed on the picture screen 4, also the color phosphor pattern of stripe shape (color stripe pattern) which forms the phosphor screen 1a is projected onto the picture screen 4 under being magnified and becomes conspicuous as shown in FIG. 2 so that the magnified picture image 5 on the picture screen 4 becomes difficult to see.

Therefore in the prior art, in order to make the color stripe pattern on the picture screen 4 unconspicuous, as shown in FIG. 3, it is proposed to locate between the projection lens 3 and the color cathode ray tube 1 a prism plate 6 which has a predetermined inclination angle α. In this case, the image light from a point P on the phosphor screen 1a of the color cathode ray tube 1 is divided into two in its optical path by one prism surface 6a and the other prism surface 6b and projected onto two points Pa and Pb on the picture screen 4. Accordingly, as shown in FIG. 4, on the picture screen 4 are formed two magnified picture images 5a and 5b, each of which is shifted little in parallel in the horizontal direction less than, for example, a pitch Lc of a pair of color stripes. As a result, on the picture screen 4 is formed the magnified picture image 5 which results from mixing these magnified picture images 5a and 5b to each other. Consequently, the number of the color stripes of the magnified picture image 5 is increased twice so that the color stripe pattern becomes not so conspicuous on the picture screen 4.

However, in the example of FIG. 3, air exists in the space between the phosphor screen 1a and the prism plate 6 and in the space between the prism plate 6 and the projection lens 3 so that due to the difference between the refractive indexes of the air and each component, the reflection is easily caused in each boundary surface, thus resulting in a multiple reflected image and a great loss of light.

DISCLOSURE OF INVENTION

Accordingly, it is an object of the present invention to reduce the reflection on the boundary surface. In order to achieve this object, according to the present invention, a video projector type television receiver comprises a prism plate located in front of a color cathode ray tube, a projection lens located in front of the prism plate and transparent liquid respectively injected into the space between the color cathode ray tube and the prism plate and the space between the prism plate and the projection lens.

The present invention is constructed as described above, and the transparent liquid is injected into the space between the color cathode ray tube and the prism plate and the space between the prism plate and the projection lens. Since the difference between the refractive indexes of the transparent liquid and each component is not so large as that between the refractive indexes of air and each component, it is possible to reduce the reflection produced on each boundary surface.

BEST MODE FOR CARRYING OUT THE INVENTION

An embodiment of the present invention will hereinafter be described with reference to FIG. 5.

Figure 1:
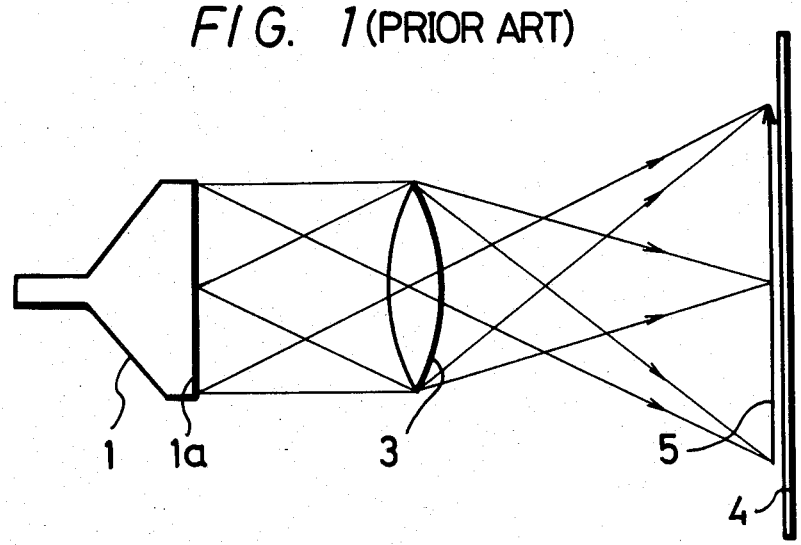
FIGS. 1 and 3 are respectively diagrams each showing an example of a prior art video projector type television receiver.
Figure 3:
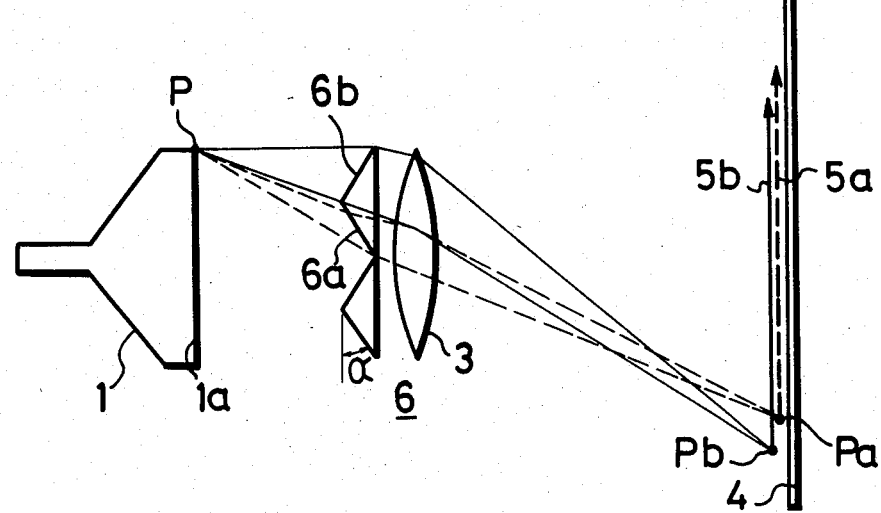
Figure 2:
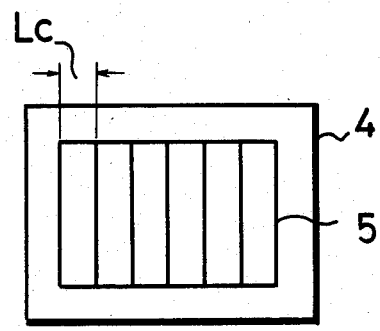
FIG. 2 is a diagram useful for explaining the example shown in FIG. 1.
Figure 4:
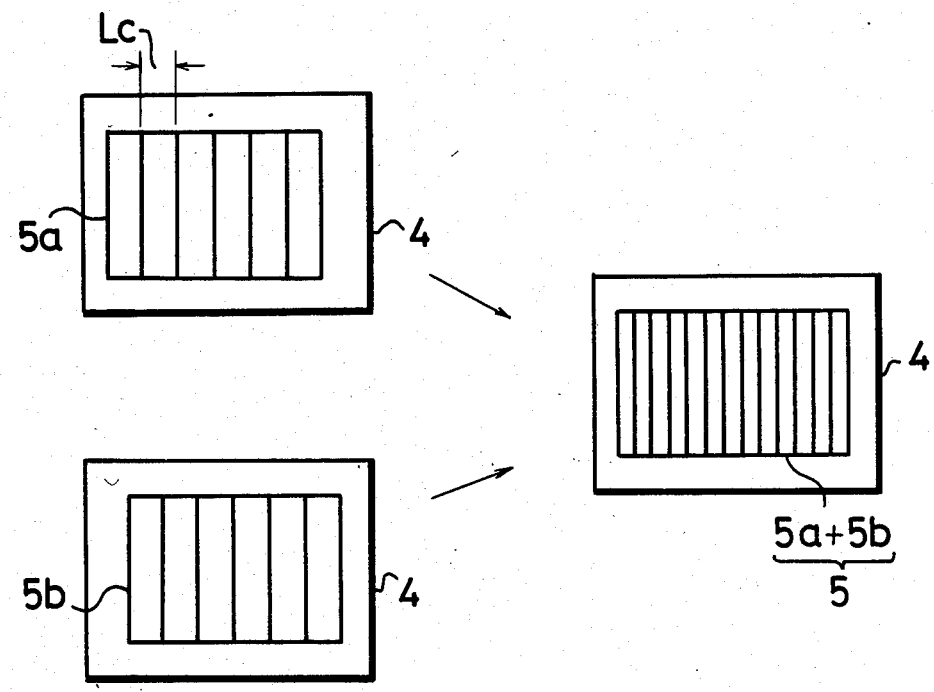
FIG. 4 is a diagram useful for explaining the example shown in FIG. 3.
Figure 5:
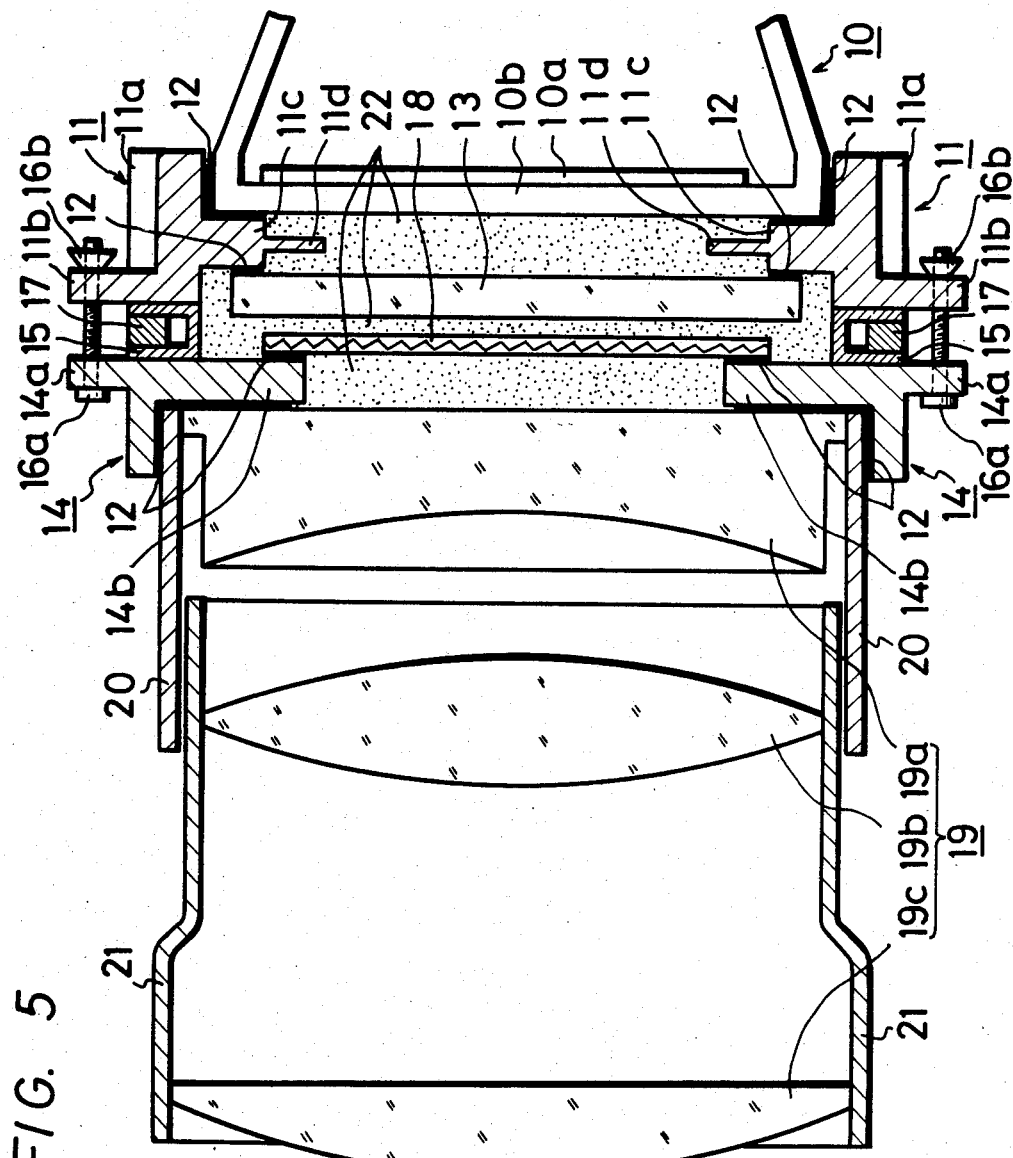
FIG. 5 is a diagram showing an embodiment of the present invention and FIGS. 6A, 6B, 7, 8A, 8B, 8C, 8D, and 8E are respectively diagrams useful for explaining a prism plate used therein.

In FIG. 5, reference numeral 10 designates a color cathode ray tube in which a phosphor screen 10a thereof is made of, for example, a color phosphor pattern of stripe shape and reference numeral 10b designates a face plate thereof.

Reference numeral 11 designates a fixed frame provided on the side of the color cathode ray tube 10 and which is made of, for example, aluminium. This fixed frame 11 is provided at its outside with a heat radiating member 11a of concave and convex shape and a flange portion 11b. The fixed frame 11 is provided at its inside with a fixed portion 11c of convex shape and on the tip end of this fixed portion 11c is formed a contact portion 11d which increases the contact area with liquid, which is injected as will be described later, to thereby increase the cooling effect. Further, the inside of the fixed frame 11 is worked black, and the fixed frame 11 is fixedly bonded to the face plate 10b of the color cathode ray tube 10 by using, for example, bonding agent 12 such as silicone resin and so on. In addition, to the fixed portion 11c of the fixed frame 11 is bonded by the bonding agent 12 a glass plate 13 which absorbs X-rays.

Reference numeral 14 designates a fixed frame provided on the side of a projection lens and which is made of, for example, aluminium. This fixed frame 14 is provided at its outside with a flange portion 14a and at its inside with a fixed portion 14b of convex shape. The inside of the fixed frame 14 is worked black.

This fixed frame 14 is fixed to the above fixed frame 11 through a packing member 15 which is made of, for example, resilient material such as rubber and so on. For example, the packing member 15 is interposed between the flange portions 11b and 14a formed on the outside portions of the fixed frames 11 and 14 and the above fixed frames are fixed together by bolts 16a and nuts 16b. Reference numeral 17 designates a spacer made of, for example, aluminium.

To the fixed member 14b of the fixed frame 14 on the side of the color cathode ray tube 10 is bonded by the bonding agent 12 a prism plate 18 which comprises a plurality of prisms, each prism having a predetermined inclination angle α. To this fixed frame 14 is bonded by the bonding agent 12 a mirror cylinder 20 in which a concave lens 19a forming a projection lens 19 is fixed. This mirror cylinder 20 is made of, for example, a plastic material and the inside thereof is worked black. The mirror cylinder 20 is engaged at its inside with a mirror cylinder 21 in which convex lenses 19b and 19c constituting the projection lens 19 are fixed. Also this mirror cylinder 21 is made of, for example, plastic material and the inside thereof is worked black.

In this embodiment, transparent liquid 22, for example, ethylene glycol is respectively injected into the space between the color cathode ray tube 10 and the glass plate 13, the space between the glass plate 13 and the prism plate 18 and the space between the prism plate 18 and the concave lens 19a. In this case, an aperture is bored through the spacer 17 made of, for example, aluminium at its predetermined position and through this aperture and further the packing member 15, a needle, for example, is inserted to inject the transparent liquid 22 into the spaces. In this case, apertures are bored through the end portions of, for example, the prism plate 18 and the glass plate 13 so as to uniformly inject the transparent liquid 22 into the spaces formed therebetween.

Figure 6A:
Figure 7:
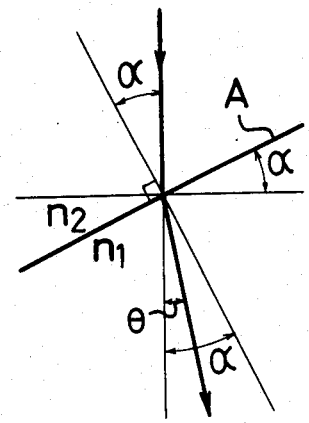
Figure 6B:
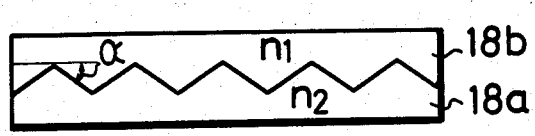
Figure 8A:
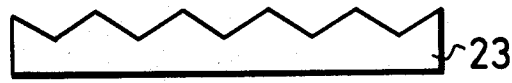
Figure 8B:
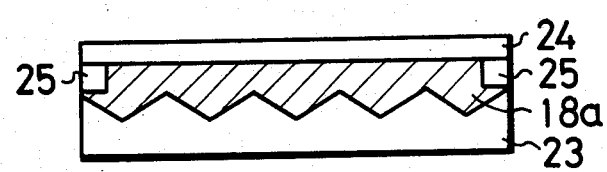
Figure 8C:
Figure 8D:
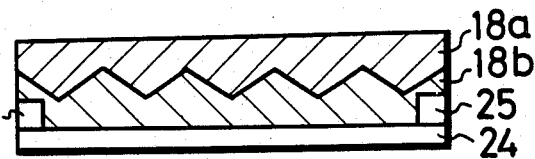
Figure 8E:
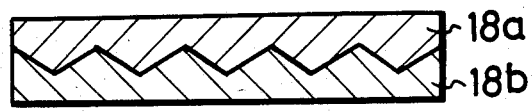

As shown in FIG. 6B, the prism plate 18 is formed of two transparent materials 18a and 18b which are bonded together and the boundary surface therebetween is made as its prism surface. Then, if the refractive index of the transparent material 18a is taken as $n_1$, the temperature coefficient thereof is taken as $\Delta n_1$, the refractive index of the transparent material 18b is taken as $n_2$ and the temperature coefficient thereof is taken as $\Delta n_2$, the materials of the transparent materials 18a and 18b are selected so as to satisfy the condition, $n_2/n_1 \approx \Delta n_2/\Delta n_1$. By way of example, as the transparent material 18a, an epoxy resin is selected which has the refractive index $n_1(25°\text{ C.}) = 1.543$ and the temperature coefficient $\Delta n_1 = -1.35 \times 10^{-4}/°\text{C.}$, while as the transparent material 18b, an epoxy resin is selected which has the refractive index $n_2(25°\text{ C.}) = 1.508$ and the temperature coefficient $\Delta n_2 = -1.30 \times 10^{-4}/°\text{ C.}$ The reason why the prism plate is constructed as mentioned above is as follows. As shown in FIG. 6A, in a prism plate formed of one transparent material 18c, when its refractive index is varied by the change of temperature, the separation angle thereof is also varied. As a result, the displacement amount of the magnified picture images on the picture screen is varied and hence it becomes impossible to obtain sufficient effect which can be achieved by the provision of the prism plate as mentioned above. Thus, the prism plate is constructed as above so as to remove this defect. That is, as shown in FIG. 7, if a solid line A is taken as the prism surface, an incident angle is taken as α and a separation angle is taken as θ, the relation expressed as $$n_2 \sin \alpha = n_1 \sin (\alpha - \theta) \quad (1)$$

is satisfied and the separation angle θ is expressed as $$\theta = \alpha - \sin^{-1}(n_2/n_1 \sin \alpha) \quad (2)$$

thus the separation angle θ is determined by $n_2/n_1$. If the refractive indexes are respectively taken as $n_1(t)$ and $n_2(t)$ when the temperature is changed by Δt, the following equation is established as $$\frac{n_2(t)}{n_1(t)} = \frac{n_2 + \Delta n_2 \Delta t}{n_1 + \Delta n_1 \Delta t} \quad (3)$$

If the condition of $\Delta n_2/\Delta n_1 \approx n_2/n_1$ is satisfied, the following equation is established $$\frac{n_2(t)}{n_1(t)} = \frac{n_2\left(1 + \frac{\Delta n_2}{n_2}\Delta t\right)}{n_1\left(1 + \frac{\Delta n_1}{n_1}\Delta t\right)} = \frac{n_2}{n_1} = \text{constant} \quad (4)$$

Therefore, when the prism plate 18 is constructed as in this embodiment, the separation angle θ is scarcely varied by the change of the temperature.

The prism plate 18 is made in accordance with a manufacturing process as, for example, shown in FIG. 8. First, as shown in FIG. 8A, a metal mold 23 is prepared to provide a predetermined prism surface. Then, as shown in FIG. 8B, a spacer 25 is interposed between this metal mold 23 and a glass plate 24 to form therebetween a space. Into this space is injected the transparent material 18a which is then cured and then molded as shown in FIG. 8C. Next, as shown in FIG. 8D, the spacer 25 is interposed between the molded transparent material 18a and the glass plate 24 to form therebetween a space into which the transparent material 18b is injected and then cured. Then, the spacer and the glass plate are released from the above product and thus the prism plate 18 is made in which the transparent materials 18a and 18b are bonded together.

As described above, according to this embodiment, since the transparent liquid 22 is respectively injected into the space between the color cathode ray tube 10 and the glass plate 13, the space between the glass plate 13 and the prism plate 18 and the space between the prism plate 18 and the concave lens 19a, as compared with a case in which air is filled into each of such spaces, it is possible to reduce the reflection which is caused on the boundary surface by the difference between the refractive indexes. Consequently, it is possible to avoid the ocurrence of the multiple reflected images and great loss of light amount. Moreover, since the transparent liquid 22 is injected into the spaces, by the liquid cooling effect of the transparent liquid, it is possible to suppress the thermal expansion of each portion so that the influence such as the change of the optical path and so on caused by the thermal expansion can be reduced. Furthermore, since the prism plate 18 is formed by bonding the two transparent materials 18a and 18b to each other as mentioned above and the separation angle θ thereof is scarcely changed by the change of temperature, it is possible to achieve the effect of the prism plate sufficiently.

While in the above embodiment into the space between the glass plate 13 and the prism plate 18 and the space between the prism plate 18 and the concave lens 19a is injected, for example, ethylene glycol as the transparent liquid 22, there may be such a fear that the ethylene glycol is absorbed by the resin which forms the prism plate 18 and hence the optical characteristics of the prism plate 18 be deteriorated. Therefore, it may be considered to use, for example, silicone oil instead of the ethylene glycol. In this case, different from the above embodiment, the spaces at both sides of the glass plate 13 are isolated from each other.

EFFECT OF THE INVENTION

As set forth above, according to the present invention, since the transparent liquid is injected into the space between the color cathode ray tube and the prism plate and the space between the prism plate and the projection lens and the difference between the refractive indexes of the transparent liquid and each component is not so large as the difference between the refractive indexes of the air and each component, it is possible to reduce the reflection on each boundary surface. As a result, it is possible to avoid the occurrence of the multiple reflected images and the large loss of light amount on the boundary surfaces. Furthermore, since the transparent liquid is injected into the spaces, this transparent liquid exhibits the liquid cooling effect by which the thermal expansion of each portion can be suppressed and hence it is therefore possible to reduce the influence such as the change of optical path caused by the thermal expansion and so on.

We claim:

1. A video projector type television receiver comprising:
    a color cathode ray tube;
    a prism plate located adjacent an image surface of said color cathode ray tube;
    a projector lens located adjacent a side of said prism plate opposite said cathode ray tube; and
    a transparent liquid injected into a first space between said color cathode ray tube and said prism plate and a second space between said prism plate and said projection lens.

2. A video projector type television receiver according to claim 1, wherein said prism plate is formed by bonding together first and second elements formed of respective transparent materials, each of said materials having a different refractive index and the inner boundary surface between said first and second elements is the prism surface of said prism plate.

3. A video projector type television receiver according to claim 2, wherein when a refractive index of said first transparent material is taken as $n_1$, a temperature coefficient thereof is taken as $\Delta n_1$, a refractive index of said second transparent material is taken as $n_2$ and a temperature coefficient thereof is taken as $\Delta n_2$, said first and second transparent materials satisfy the condition of $n_2/n_1 \approx \Delta n_2/\Delta n_1$.

4. A video projector type television receiver according to claim 2, wherein said first element is formed of transparent material having a refractive index $n_1 = 1.543$ and a temperature coefficient $\Delta n_1 = -1.35 \times 10^{-4}/C°$.

5. A video projector type television receiver according to claim 4, wherein said second element of transparent material has a refractive index $n_2 = 1.508$ and a temperature coefficient $\Delta n_2 = -1.3 \times 10^{-4}/C°$.

6. A video projector type television receiver according to claim 1, wherein said transparent liquid is ethylene glycol.

7. A video projector type television receiver according to claim 1, wherein said transparent liquid is silicone oil.

8. A video projector type television receiver according to claim 1, in which said image surface of said cathode ray tube, said prism plate, and said projector lens are arranged within a liquid tight frame with said transparent liquid residing therein.

9. A video projector type television receiver according to claim 8, wherein inside surfaces of said frame are non-reflective black.

10. A video projector type television receiver according to claim 8, in which said frame includes means adapted for facilitating injection of said fluid into said first and second spaces.

11. A video projector type television receiver according to claim 10, wherein said means adapted for facilitating said injection comprises an aluminum ring having an aperture formed therein to receive a liquid-injector needle.

12. A video projector type television receiver according to claim 11, wherein said prism plate includes an aperture bored therethrough for distribution of said transparent liquid between said first and second spaces.

* * * * *